(12) United States Patent
Leist

(10) Patent No.: US 7,839,736 B2
(45) Date of Patent: Nov. 23, 2010

(54) CD-AUDIO SYSTEM HAVING ELECTRONIC SHOCK PROTECTION

(75) Inventor: Martin Leist, Taipei (TW)

(73) Assignee: Philips & Lite-On Digital Solutions Corporation, Neihu District, Taipei (TW)

( * ) Notice: Subject to any disclaimer, the term of this patent is extended or adjusted under 35 U.S.C. 154(b) by 493 days.

(21) Appl. No.: 12/060,236

(22) Filed: Mar. 31, 2008

(65) Prior Publication Data

US 2009/0249377 A1    Oct. 1, 2009

(51) Int. Cl.
G11B 15/52    (2006.01)

(52) U.S. Cl. .................. 369/47.32; 369/53.35

(58) Field of Classification Search ........... None
See application file for complete search history.

(56) References Cited

U.S. PATENT DOCUMENTS

| | | | | |
|---|---|---|---|---|
| 5,590,112 A | * | 12/1996 | Morishima | 369/47.29 |
| 5,883,869 A | * | 3/1999 | Tamai et al. | 369/47.32 |
| 6,115,337 A | * | 9/2000 | Takagi et al. | 369/47.33 |
| 6,683,825 B2 | * | 1/2004 | Sato | 369/30.23 |
| 7,554,911 B2 | * | 6/2009 | Youn | 370/232 |
| 2003/0210617 A1 | | 11/2003 | Millikan | |
| 2004/0165486 A1 | * | 8/2004 | Ueki | 369/30.23 |
| 2007/0091745 A1 | | 4/2007 | Matsui | |

OTHER PUBLICATIONS

Nara Won:"Electronic Shock Protection (ESP) for CD Players That Use a TMS320C54x", XP002499936, Jul. 2001, Texas Instruments, Dallas, Texas, USA.

* cited by examiner

Primary Examiner—Paul Huber
(74) Attorney, Agent, or Firm—Winston Hsu; Scott Margo

(57) ABSTRACT

A CD-Audio System includes a CD-module and a host unit. The CD-module reads audio data from a disc, checks the audio data for errors, and provides the checked audio data to the host unit at greater than 1 times CD audio rate. The host unit stores the received audio data in an electronic shock protection memory included in the host unit. When the CD-module determines an error in the audio data, the CD-module notifies the host unit of the position in the audio data of the error and when notified of a position in the audio data of an error, the host unit replaces stored audio data at that position and all subsequently already received data with retransmitted audio data. Then the host outputs only validated audio data via speakers.

16 Claims, 2 Drawing Sheets

CD-AUDIO SYSTEM HAVING ELECTRONIC SHOCK PROTECTION

BACKGROUND OF THE INVENTION

1. Field of the Invention

This application relates to a CD-Audio system having electronic shock protection, and more specifically to a redistribution of functions involved in the electronic shock protection of the CD-Audio system.

2. Description of the Prior Art

Systems to reproduce audio signals from a Compact Disc (CD) are used in several conditions. Complete CD-Audio entertainment systems consist typically of a CD-Module and a host unit, which usually implements the Human Machine Interface (HMI). Many host units have also entertainment units implemented to reproduce compressed audio formats like MP3 or WMA from CD or other media (e.g. flash memory cards or USB-memory Sticks). Also navigation units are often implemented in the complete system. Such complex systems need memory resources for processing compressed audio decoding or calculations for navigation.

Especially in portable and automotive entertainment systems, a so-called Electronic Shock Protection (ESP) method is used to overcome reading problems produced by mechanical shocks. The ESP method normally uses a memory buffer to store the audio data before the data is presented to the speakers. The buffer is filled with audio data at higher speed than the audio data is presented to the speakers. When mechanical shocks happen to the system, the filling of the buffer stops but audio data for presentation is still available until the audio buffer is empty. During this time retries for reading new audio data from the CD are executed.

Two implementations for CD-Audio ESP-Systems are available in the market:

1. ESP-System is implemented completely in the CD-Module.
2. ESP-System is implemented completely in the host system.

In the first case, the disadvantage is that the ESP-Memory is assembled in the CD-Module and can be used for CD-Audio playback only. During playback of CD-Audio tracks, usually the memory resources of the host unit are not required and are wasted. On the other hand, when CD-Audio is not being reproduced, the ESP-memory in the CD-Module is not used and is wasted. This system is costly because of double assembled memory.

In the second case, the disadvantage is that the host needs a processor with high performance to detect erroneous data and for seamless connection of the incoming pieces of audio. Often performance and reliability problems are caused by insufficient host processor performance in these systems. Usually the host unit implements the ESP-system to overcome wasting of memory. In these applications, simple CD-Modules without any ESP functionalities are used. Also the fact that, for every single application, the ESP-system has to be implemented completely in the host, which increases development time and requires a lot of knowledge about different kind of CDs produced in the market.

SUMMARY OF THE INVENTION

The present disclosure describes a CD-Audio ESP-System, which overcomes the disadvantages of both cases described above, based on a distribution of tasks and memory of CD-Module and host unit.

A CD-Audio System having electronic shock protection comprises a CD-module for outputting audio data from a disc with a rate greater than 1 times CD audio speed, outputting to the host an error signal providing information about audible data errors and the accurate position of these data errors, and outputting to the host a valid signal providing in information about valid data and the accurate position of the data The CD-Audio System further comprises a host unit having an electronic shock protection audio memory. The host unit receives the audio data output by the CD-module via a digital interface and detects a correct audio data position in the received audio data for seamlessly connecting received valid audio data packets according to the said error signals and the said valid signals.

The present disclosure further provides a method of operating a CD-Audio ESP-System comprising a CD-module and a host unit. The method comprises the host unit activating an audio receiver comprised by the host unit to receive data from the CD-module and sending a command via a CD-module Control interface to the CD-module to get audio data from a designated position on the CD. The CD-module accesses the designated position on the CD and starts to provide audio data to the audio receiver of the host unit. The audio receiver receives the audio data from the CD-module and writes the audio data to an audio data ESP-memory comprised by the host unit. When the CD-module detects an audio data error of the data, which has already been sent to the host unit, the CD-module sends information to the host unit to indicate the position of the packet of the first invalid audio data sent to the host unit. When the host unit receives this information, the host unit deactivates the audio receiver and throws away the data packet at the first invalid position and all following data packets that are already received. Finally, when the host unit has received a certain amount of audio data, which has been validated by the CD-module, the host unit starts the audio presentation via an audio transmitter comprised by the host unit and speakers.

The present disclosure further provides another method of operating a CD-Audio ESP-System comprising a CD-module and a host unit. Here, the CD-module reads audio data from a disc, checks if the audio data errors exist, and provides the checked audio data to the host unit at greater than 1 times CD audio rate. The host unit stores the received audio data in an ESP-memory comprised by the host unit. When the CD-module determines an audio data error, the CD-module notifies the host unit of the position of the audio data error. When the host is notified of a position of the audio data error, the host unit replaces stored audio data at that position and all subsequent data that has already been received with retransmitted audio data. Then the host outputs only validated audio data via speakers.

These and other objectives of the present invention will no doubt become obvious to those of ordinary skill in the art after reading the following detailed description of the preferred embodiment that is illustrated in the various figures and drawings.

DETAILED DESCRIPTION

The essential features of the invention include but are not limited to reduction of cost and development time, and improved performance and reliability of an ESP-System. Cost reduction of the total ESP-entertainment system may be achieved by leaving out the ESP-Memory in the CD-Module. Cost reduction and performance improvement of the total ESP-entertainment system is also attained by distribution of ESP-system tasks between CD-Module and host to minimize the required host processing performance for ESP implementation. Reduction of development time and improvement of reliability occurs through support of the ESP-system from the CD-Module.

A number of functions have to be provided in the system to implement the optimal ESP-system. According to the present invention, the CD-Module preferably implements at least the following seven functions:

1. Providing audio data from the disc to the host with a rate greater than 1 times CD audio speed.

2. Providing audio data of an accurate position on the disc controlled by commands from the host unit.

3. Detection of audible errors coming from the CD-decoder unit in the CD-module (e.g. produced by mechanical vibration or shocks).

4. Providing information sent to the host about audible data errors and the accurate position of the data errors or the possibility to avoid providing audible data errors caused by mechanical shocks or vibration to the host.

5. Providing information sent to the host periodically about valid data and the accurate position.

6. Reducing error rate by modifying parameters and conditions of the CD reading process based on audio buffer information from the host.

7. Reducing the audio connection processes of the host by modifying the speed of the CD reading process based on audio buffer information from the host.

Also according to the present invention, the host unit preferably implements at least the following three functions:

1. Providing an ESP-memory for audio data received from the CD-module via a digital audio data interface.

2. Providing information about ESP-memory usage periodically to the CD-module.

3. A possibility to receive data on a digital audio data interface with one of the following requirements:

3a. Receiving audio data without any loss of data at a beginning of a new data transmission sequence.

3b. Receiving audio data with a known amount of data loss at the beginning of a new data transmission sequence (e.g. loss because of synchronization in the digital audio data interface).

3c. Receiving audio data with the possibility to detect accurately the correct audio data position for seamless connection of audio data packets (e.g. correlation of last valid audio samples in the memory with incoming audio stream from the CD-module).

By the distribution of functions described above, an optimal ESP-system can be implemented. But also an implementation of some selected functions is possible to improve an ESP-system without departing from the spirit of the invention.

Figure 1:
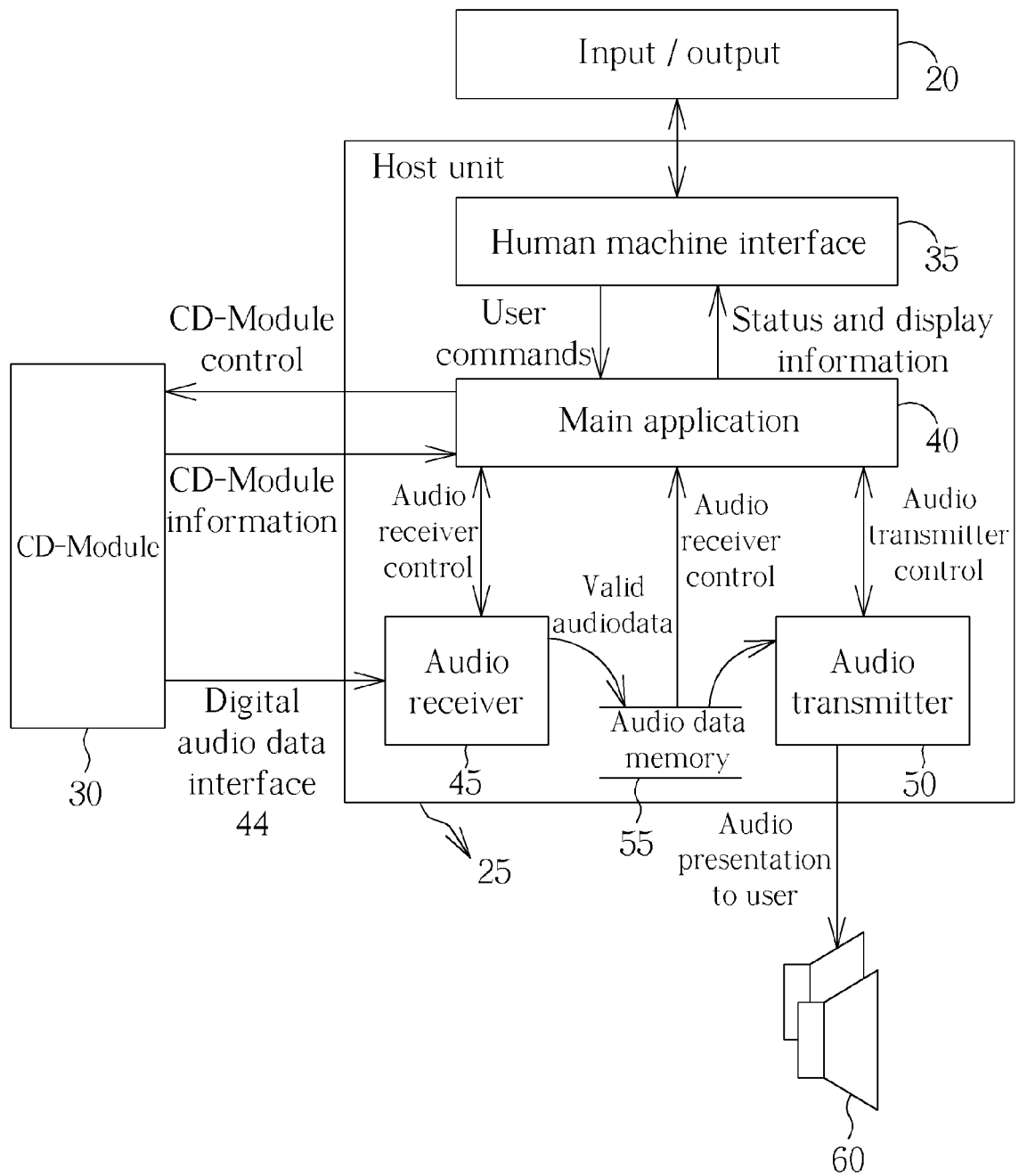
FIG. 1 is a functional block diagram of a CD-Audio ESP-System according to the present invention.

The following sequence shows one example implementation of such an optimized ESP-system. FIG. 1 shows a functional block diagram of such a possible implementation in the host unit. Each block may be a separate hardware unit or software/firmware unit in the host unit.

In FIG. 1, the ESP-entertainment system 10 comprises a Host unit 25, a CD-Module 30, an input/output interface 20 and a speaker 60. The Host unit 25 is coupled to the CD-Module 30 for sending the CD-Module control command to said CD-Module 30 and receiving the CD-Module information from the CD-module 30 via one or more command/data interface, lines or buses. The Host unit 25 is also coupled to the input/output interface 20 which may be implemented by buttons/displays for receiving commands from users. The Host unit 20 further may be coupled to at least one speaker 60 for presentation of audio data to the user.

Furthermore, the Host unit 25 may comprise a Main application 40, a Human machine interface 35, an Audio receiver 45, a Digital audio data interface 44, an Audio transmitter 50, and an Audio data memory 55. The Main Application 40 is coupled to the CD-module 30 for sending the CD-module control commands from the Host unit 25 to the CD-Module 30 and receiving the CD-Module information from the CD-Module 30. The Human machine interface 35 is coupled between the input/output interface 20 and the Main Application 40 for transferring user commands from the input/output interface 20 to the Main Application 40 and transferring status and display information from the Main application 40 to the input/output interface 20.

The Audio receiver 45 is coupled to the Main application 40 to receive an audio receiver control signal, and is also coupled to the CD-module 30 to receive digital audio data from the CD-Module 30 via the Digital audio data interface 44. Furthermore, the Audio receiver 45 outputs valid audio data to the Audio data memory 55. The Audio data memory 55 outputs an audio receiver control signal to the Main Application 40 indicating current status of the Audio data memory 55 and also outputs stored valid audio data received from the Audio receiver 45 to the Audio transmitter 50. The Audio transmitter 50 sends and receives an audio transmitter control signal to and from the Main Application 40 and outputs received valid audio data to the speaker 60 accordingly.

In operation, the ESP-entertainment system 10 preferably functions in the manner shown in the following list.

1. The Host unit 25 decides or gets a user command (see FIG. 1) which position or track of the CD is to be played.

2. The Host unit 25 activates the Audio Receiver 45 (see FIG. 1) to receive data from the CD-Module 30.

3. The Host unit 25 sends a CD-Module control command to the CD-Module 30 to get audio data from the designated position on the CD.

4. The CD-Module 30 accesses the designated position on the CD and starts providing audio data to the Audio receiver 45 in the Host unit 25.

5. The Audio receiver 45 in the Host unit 25 receives the audio data from the CD-Module 30 and writes the data into the Audio data memory 55. The Host unit 25 periodically sends information about the buffer status (the Audio data memory 55) to the CD-Module 30.

Figure 2:
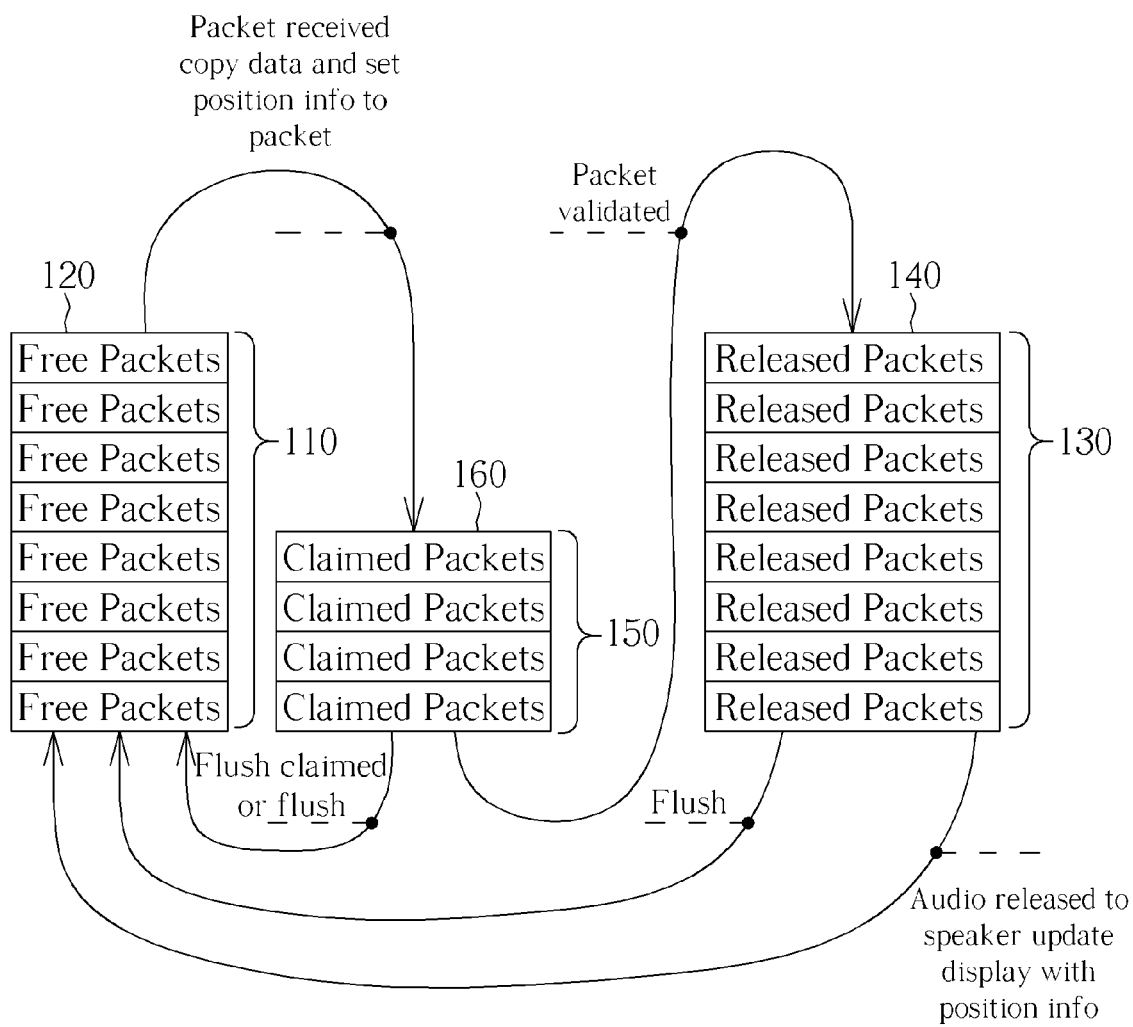
FIG. 2 shows a possible management of the audio memory of FIG. 1.

6. The CD-Module 30 periodically sends information to the Host unit 25 to validate the received audio data. The Host unit 25 has to count the received data accurately and the validation has to be done accurately. FIG. 2 shows a possible management of the ESP-memory (Audio data memory 55) and will be discussed further later. The packets size is optimal if the size is equal to the resolution of validation and error position information.

7. If the Host unit 25 has received a certain amount of audio data, which has been validated by the CD-module 30, the Host unit 25 starts the Audio transmitter 50 (see FIG. 1) and the audio presentation via the Speakers 60 starts. Audio data, which cannot be validated from the CD-Module 30, must not be presented to the user. Therefore, a delay between initiating a request for audio data and presenting the received audio data to the user has to be executed in the case when the audio presentation has stopped and must be started again (e.g. ESP-memory underrun or startup with empty buffer) to guarantee a minimum amount of audio presentation time.

8. If the buffer is filled (no free packet available) the Host unit deactivates the Audio receiver 45 and sends a pause command to the CD-Module 30. The response from the CD-Module 30 is the validation information and the Host unit 25 validates the received data accordingly. The Host unit 25 waits until a certain amount of free packet spaces are available and continues with item 10 of this list.

9. If the CD-Module 30 detects an audio data error in data that has already been sent to the Host unit 25, the CD-Module 30 sends information to the Host unit 25 to indicate the first invalid position of the error which has been already sent to the Host unit 25. The Host unit 25 has to deactivate the Audio receiver 45 and has to validate all packets before this position of the error and throw away the data of the invalid packet and all following packets, which are already received.

10. The Host unit 25 sends a command to the CD-Module 30 to get audio data on the required position on the CD (position of one packet after the last validated packet). The sequence continues at item 4 of this list.

Finally, please refer to FIG. 2, which shows a possible management of the ESP-memory (Audio data memory 55). The Audio data memory 55 functionally may operate by keeping track of three separate zones of the memory. A first zone 110 contains zero or more available spaces (Free Packets 120) for storing new data from the Audio receiver 45. A second zone 150 contains zero or more received packets (Claimed Packets 160). A third zone 130 contains zero or more packets (Released Packets 140) from which audio data is currently or has already been transmitted to the speaker 60 via the Audio transmitter 50.

Each of the three memory zones optimally may vary in size from zero to the size of the Audio data memory 55, with the sum of the sizes of each of the zones preferably being equal to the size of the Audio data memory 55. As audio data is received by the Audio data memory 55, a Free Packet 120 is located and the received audio data is stored therein, whereupon the Free Packet 120 may be considered a Claimed Packet 160. When the audio data is to be transmitted to the speaker 60, the Claimed Packet 160 holding the received audio data may become considered a Released Packet 140. When the audio data has been completely transmitted to the Audio transmitter 50, the Released Packet 140 again becomes considered a Free Packet 120 and the cycle may continue. As can be appreciated by those skilled in the art, many methods of packet management, such as FIFO or random access may be utilized without departing from the spirit of the invention.

In summary, the invention reduces the cost and improves the quality and reliability for a complete entertainment system which implements an ESP-system for CD-Audio playback by optimal distribution of tasks and resources in the system. Only a single audio memory is required and because audio errors are detected in the CD-module, a high performance processor to detect erroneous data and seamless connection of the incoming pieces of audio is not needed by the host unit.

Those skilled in the art will readily observe that numerous modifications and alterations of the device and method may be made while retaining the teachings of the invention.

What is claimed is:

1. A CD-Audio System having electronic shock protection comprising:

a CD-module for outputting audio data from a disc with a data rate greater than 1 times CD audio speed, outputting an error signal providing information about detection of audible data errors and the accurate position of the data errors; and a host unit comprising an electronic shock protection audio memory, the host unit for receiving the audio data output by the CD-module into the memory and detecting accurately a correct audio data position in the received audio data for seamlessly connecting received valid audio data packets according to the error signals before outputting the valid audio data packets to a speaker.

2. The CD-Audio System of claim 1 wherein the host unit is also used for outputting information about usage of the electronic shock protection memory periodically to the CD-module.

3. The CD-Audio System of claim 2 wherein the CD-module outputs audio data from an accurate position on the disc as controlled by commands from the host unit.

4. The CD-Audio System of claim 2 wherein the CD-module reduces an error rate by modifying parameters and conditions of the CD reading process based on the information about usage of the electronic shock protection memory output from the host unit.

5. The CD-Audio System of claim 2 wherein the CD-module reduces audio connection processes of the host unit by modifying speed of the CD reading process based on the information about usage of the electronic shock protection memory output from the host unit.

6. The CD-Audio System of claim 2 wherein the host unit outputs audio data without any loss of data, or with a known loss of data at a beginning of a new data transmission sequence.

7. A method of operating a CD-Audio System comprising a CD-module and a host unit, the method comprising:

providing audio data by the CD-module;

receiving the audio data and writing the audio data to an audio data memory comprised by the host unit;

when the CD-module detects an audio data error in data that has already been sent to the host unit, the CD-module sending information to the host unit indicating a first invalid data position sent to the host unit;

when the host unit receives the information from the CD-module indicating the first invalid data position, the host unit throwing away a data packet at the first invalid position and all following data packets which are already received; and when the host unit has received a certain amount of audio data, which has been validated by the CD-module, the host unit starting an audio presentation by a speaker.

8. The method of claim 7 further comprising determining a designated position or track of a CD to be played by the host unit.

9. The method of claim 8 further comprising activating an audio receiver comprised by the host unit to receive data from the CD-module by the host unit.

10. The method of claim 9 further comprising sending a command to the CD-module to get audio data from the designated position on the CD by the host unit.

11. The method of claim 9 further comprising sending a command via a CD-Module Control interface to the CD-module to get audio data from the designated position on the CD by the host unit.

12. The method of claim 11 further comprising accessing the designated position on the CD and starting to provide audio data to the audio receiver of the host unit by the CD-module.

13. The method of claim 7 further comprising starting the audio presentation via an Audio Transmitter comprised by the host unit and the speaker.

14. The method of claim 7 further comprising sending information about status of the audio data memory to the CD-module by the host unit.

15. The method of claim 14 when the audio data memory is full, the host sending a pause command to the CD-module until a predetermined amount of the audio data memory becomes available, at which time the host unit reactivates an audio receiver and sends a resume command to the CD-module.

16. A method of operating a CD-Audio System comprising a CD-module and a host unit, the method comprising:

reading audio data from a disc, checking the audio data for errors, and providing the checked audio data to a host unit at greater than 1 times CD audio rate by the CD-module;

storing the provided audio data in an electronic shock protection memory comprised by the host unit;

when the CD-module determines an error in the audio data, the CD-module notifying the host unit of the position in the audio data of the error;

when the host unit is notified of a position in the audio data of an error, the host unit replacing stored audio data at that position and all audio data after that position already received by the host unit with retransmitted audio data; and outputting only validated audio data via the speaker by the host.

* * * * *